(12) United States Patent
Hsieh et al.

(10) Patent No.: US 10,339,046 B1
(45) Date of Patent: Jul. 2, 2019

(54) DATA MOVING METHOD AND STORAGE CONTROLLER

(71) Applicant: SHENZHEN EPOSTAR ELECTRONICS LIMITED CO., Shenzhen OT (CN)

(72) Inventors: Hung-Chih Hsieh, Hsinchu County (TW); Yu-Hua Hsiao, Hsinchu County (TW)

(73) Assignee: SHENZHEN EPOSTAR ELECTRONICS LIMITED CO., Shenzhen (CN)

( * ) Notice: Subject to any disclaimer, the term of this patent is extended or adjusted under 35 U.S.C. 154(b) by 0 days.

(21) Appl. No.: 15/974,707

(22) Filed: May 9, 2018

(30) Foreign Application Priority Data

Mar. 9, 2018 (TW) .............. 107108136 A

(51) Int. Cl.
| G06F 12/00 | (2006.01) |
| G06F 12/02 | (2006.01) |
| G06F 12/1009 | (2016.01) |
| G06F 3/06 | (2006.01) |

(52) U.S. Cl.
CPC .......... G06F 12/0246 (2013.01); G06F 3/064 (2013.01); G06F 3/0611 (2013.01); G06F 3/0656 (2013.01); G06F 3/0659 (2013.01); G06F 3/0679 (2013.01); G06F 12/1009 (2013.01); G06F 2212/7201 (2013.01)

(58) Field of Classification Search
CPC ............. G06F 12/0246; G06F 12/1009; G06F 3/0611; G06F 3/064; G06F 3/0656; G06F 3/0659; G06F 3/0679; G06F 2212/7201
See application file for complete search history.

(56) References Cited

U.S. PATENT DOCUMENTS

| 2008/0229000 | A1 | 9/2008 | Kim |
| 2017/0090759 | A1* | 3/2017 | Ioannou .................. G06F 3/064 |

FOREIGN PATENT DOCUMENTS

| TW | 201523616 | 6/2015 |
| TW | 201611034 | 3/2016 |
| TW | 201706847 | 2/2017 |
| TW | 201719378 | 6/2017 |

OTHER PUBLICATIONS

"Office Action of Taiwan Counterpart Application", dated Sep. 18, 2018, p. 1-10.

* cited by examiner

Primary Examiner — Shawn X Gu
(74) Attorney, Agent, or Firm — JCIPRNET

(57) ABSTRACT

A data moving method and a storage controller are provided. The method includes: when obtained valid data is sequential data, transmitting a first read command to read a first data and a second data from a first plane and a second plane of a first die, transmitting a second read command to read a third data and a fourth data from a first plane and a second plane of a second die, and transmitting the first data, the third data, the second data and the fourth data to a buffer memory in an order; and transmitting a first programming command to program the first data and the second data to a first plane and a second plane of a third die, and transmitting a second programming command to program the third data and the fourth data to a first plane and a second plane of a fourth die.

22 Claims, 7 Drawing Sheets

DATA MOVING METHOD AND STORAGE CONTROLLER

CROSS-REFERENCE TO RELATED APPLICATION

This application claims the priority benefit of Taiwan application serial no. 107108136, filed on Mar. 9, 2018. The entirety of the above-mentioned patent application is hereby incorporated by reference herein and made a part of this specification.

BACKGROUND OF THE DISCLOSURE

Field of the Disclosure

The disclosure is related to a data moving method and a storage controller, and particularly to a data moving method and a storage controller capable of maintaining continuity of data after sequential data is moved.

Description of Related Art

When sequential data is programmed to a flash memory, maintaining the continuity of physical block address of data is the key to improve efficacy of reading operation. However, in some data moving operation, such as garbage collection (GC) operation or wear leveling operation, the continuity of data cannot be maintained. For example, in garbage collection operation, in order to reduce time for collecting garbage, the continuity of collected valid data cannot be maintained. The arranging order of data is subject to the correcting speed of error correction code (ECC) and responding speed of multiple channels or multiple die. Accordingly, more efforts are required from practitioners of the field to find out how to maintain continuity of data in data moving operation.

SUMMARY OF THE DISCLOSURE

The disclosure provides a data moving method and a storage controller, which are capable of maintaining continuity of data in data moving operation.

The disclosure provides a data moving method, adaptable for controlling a storage device equipped with flash memory. The flash memory includes a plurality of dice. The dice include a first die corresponding to a first channel and a second die corresponding to a second channel. Each of the dice includes a plurality of planes such as a first plane and a second plane. The data moving method includes the following steps: performing data moving operation to obtain valid data from a plurality of source blocks, wherein the valid data includes a first data, a second data, a third data and a fourth data; determining whether the valid data is sequential data, when the valid data is sequential data, transmitting a first 2-plane read command to read the first data and the second data respectively from the first plane and the second plane of the first die through the first channel, transmitting a second 2-plane read command to read the third data and the fourth data respectively from the first plane and the second plane of the second die through the second channel, and transmitting the first data, the third data, the second data and the fourth data to a buffer memory in an order; and transmitting a first 2-plane programming command to program the first data and the second data respectively to the first plane and the second plane of the third die among the dice, and transmitting a second 2-plane programming command to program the third data and the fourth data respectively to the first plane and the second plane of the fourth die among the dice.

The disclosure provides a storage controller, adaptable for controlling a storage device equipped with a flash memory. The flash memory includes a plurality of dice. The dice include a first die corresponding to a first channel and a second die corresponding to a second channel. Each of the dice includes a first plane and a second plane. The storage controller includes a processor; and a memory, coupled to the processor, wherein the memory includes a buffer memory. The processor performs data moving operation to obtain valid data from a plurality of source blocks. The valid data includes a first data, a second data, a third data and a fourth data. The processor determines whether the valid data is sequential data. When the valid data is sequential data, a first 2-plane read command is transmitted to read the first data and the second data respectively from the first plane and the second plane of the first die through the first channel. A second 2-plane read command is transmitted to read the third data and the fourth data respectively from the first plane and the second plane of the second die through the second channel, and the first data, the third data, the second data and the fourth data are transmitted to the buffer memory in an order. The processor transmits a first 2-plane programming command to program the first data and the second data respectively to the first plane and the second plane of the third die among the dice, and a second 2-plane programming command is transmitted to program the third data and the fourth data respectively to the first plane and the second plane of the fourth die among the dice.

According to the above, in the disclosure, the data moving method and the storage controller determine whether the valid data for performing data moving operation is sequential data. If the valid data for performing data moving operation is sequential data, the processor transmits the first data, the third data, the second data and the fourth data in the valid data to the buffer memory in an order, and programs the first data, the third data, the second data and the fourth data to the die without changing the original data continuity of the first data, the third data, the second data and the fourth data before the data moving operation.

In order to make the aforementioned features and advantages of the disclosure more comprehensible, embodiments accompanying figures are described in detail below.

DESCRIPTION OF EMBODIMENTS

In the embodiment, a storage device includes a rewritable non-volatile memory module and a storage device controller (also referred to as storage controller or a storage control circuit). In addition, the storage device is used together with a host system such that the host system can write data into the storage device or read data from the storage device.

Figure 1:
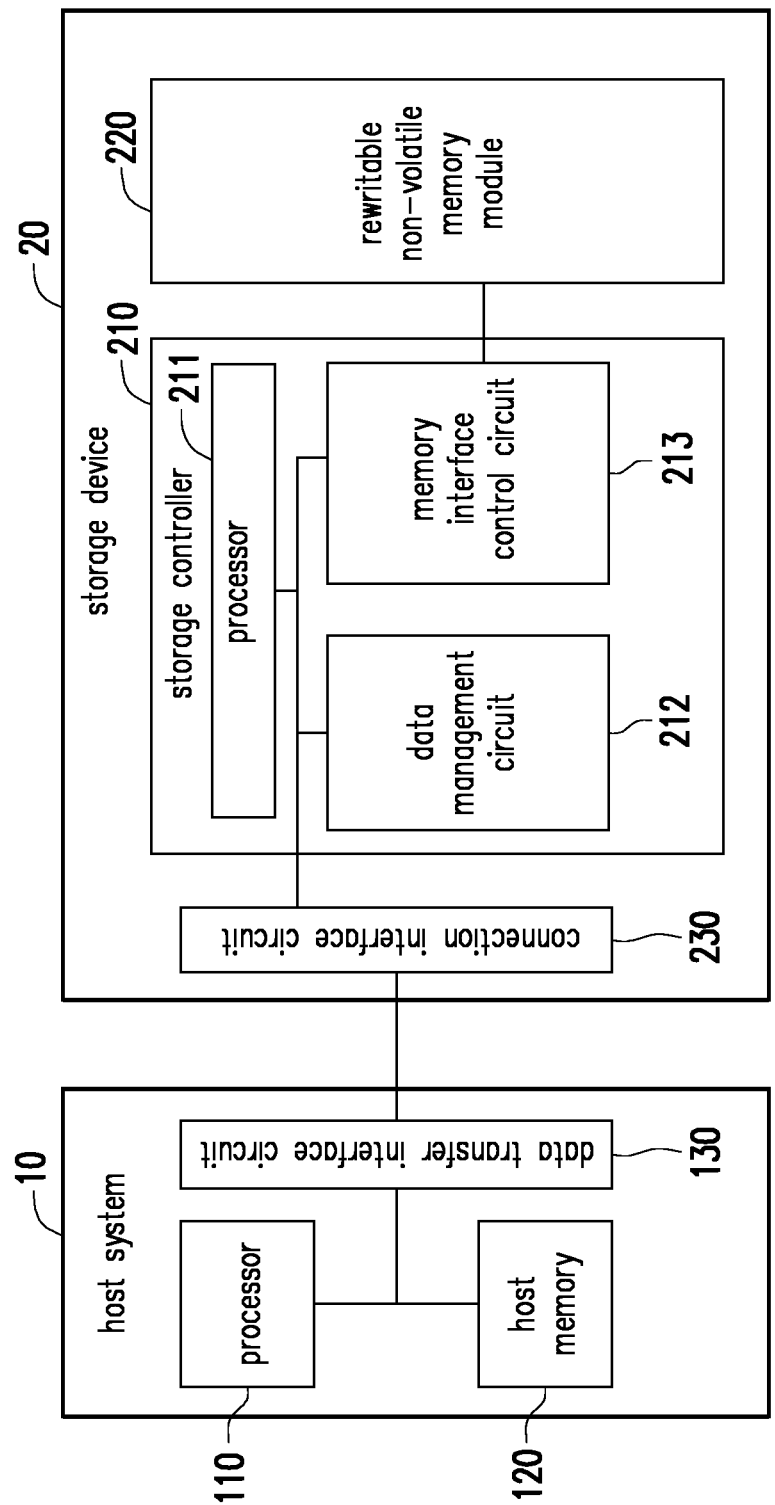
FIG. 1 is a block schematic diagram of a host system and a storage device according to an embodiment of the disclosure.

FIG. 1 is a block schematic diagram of a host system and a storage device according to an embodiment of the disclosure.

Referring to FIG. 1, a host system 10 includes a processor 110, a host memory 120 and a data transfer interface circuit 130. In the embodiment, the data transfer interface circuit 130 is coupled to (also described as electrically connected to) the processor 110 and the host memory 120. In another embodiment, the processor 110, the host memory 120 and the data transfer interface circuit 130 are coupled to one another by a system bus.

A storage device 20 includes a storage controller 210, a rewritable non-volatile memory module 220 and a connection interface circuit 230. The storage controller 210 includes a processor 211, a data management circuit 212 and a memory interface control circuit 213.

In the embodiment, the host system 10 is coupled to the storage device 20 via the data transfer interface circuit 130 and the connection interface circuit 230 of the storage device 20 to perform data-accessing operation. For example, the host system 10 may store the data in the storage device 20 or read data from the storage device 20 via the data transfer interface circuit 130.

In the embodiment, the processor 110, the host memory 120 and the data transfer interface circuit 130 may be disposed on a motherboard of the host system 10. The number of the data transfer interface circuit 130 may be one or more. Via the data transfer interface circuit 130, the motherboard may be coupled to the storage device 20 in a wired or a wireless manner. The storage device 20 may be, for example, a flash drive, a memory card, a solid state drive (SSD) or a wireless memory storage device. The wireless memory storage device may be, for example, a memory storage device using various wireless communication technologies such as a near field communication (NFC) memory storage device, a WiFi memory storage device, a Bluetooth memory storage device or a low-power consumption Bluetooth memory storage device (e.g., iBeacon) and so on. In addition, the motherboard may be coupled to various I/O devices such as a global positioning system (GPS) module, a network interface card, a wireless transfer device, a keyboard, a screen, a mouse, a speaker and so on via the system bus.

In the embodiment, the data transfer interface circuit 130 and the connection interface circuit 230 are interface circuits that are compatible with the Peripheral Component Interconnect Express (PCI Express) standard. Meanwhile, the transfer of data between the data transfer interface circuit 130 and the connection interface circuit 230 is performed by a Non-Volatile Memory express (NVMe) communication protocol.

However, it should be understood that the disclosure is not limited thereto. The data transfer interface circuit 130 and the connection interface circuit 230 may comply with the Parallel Advanced Technology Attachment (PATA) standard, the Institute of Electrical and Electronic Engineers (IEEE) 1394 standard, the Serial Advanced Technology Attachment (SATA) standard, the Universal Serial Bus (USB) standard, the SD interface standard, the Ultra High Speed-I (UHS-I) interface standard, the Ultra High Speed-II (UHS-II) interface standard, the Memory Stick (MS) interface standard, the Multi-Chip Package interface standard, the Multi Media Card (MMC) interface standard, the eMMC interface standard, the Universal Flash Storage (UFS) interface standard, the eMCP interface standard, the CF interface standard, the Integrated Device Electronics (IDE) standard or other suitable standards. In addition, in another embodiment, the connection interface circuit 230 may be packaged in one chip along with the storage controller 210; alternatively, the connection interface circuit 230 may be disposed outside a chip containing the storage controller 210.

In the embodiment, the host memory 120 is used for temporarily storing the command or data executed by the processor 110. For example, in the exemplary embodiment, the host memory 120 may be a dynamic random access memory (DRAM), a static random access memory (SRAM) and so on; but it should be indicated that the disclosure is not limited thereto. The host memory 120 may be other suitable memories.

The storage controller 210 is used for executing a plurality of logic gates or control commands implemented in a hardware form or a firmware form, and perform data writing, data reading and data erasing operations in the rewritable non-volatile memory module 220 according to the command of the host system 10.

More specifically, the processor 211 of the storage controller 210 is a hardware that has a computing capability for controlling the overall operation of the storage controller 210. Specifically, the processor 211 includes a plurality of control commands. The control commands are executed to perform data writing, data reading and data erasing operations when the storage device 20 is operated.

It should be mentioned that, in the embodiment, the processor 110 and processor 211 are, for example, a central processing unit (CPU), a micro-processor, or other programmable unit (Microprocessor), a digital signal processor (DSP), a programmable controller, an application specific integrated circuit (ASIC), a programmable logic device (PLD) or other similar circuit component, which should not be construed as a limitation to the disclosure.

In one embodiment, the storage controller 210 further includes a read-only memory (not shown) and a random access memory (not shown). In particular, the read-only memory has a boot code. When the storage controller 210 is enabled, the processor 211 executes the boot code first to load the control command stored in the rewritable non-volatile memory module 220 into the random access memory of the storage controller 210. Thereafter, the processor 211 runs the control commands to perform data writing, data reading and data erasing operations and the like. In another embodiment, the control command of the processor 211 may be stored as a program code in a specific area of the rewritable non-volatile memory module 220, for instance, in a physical storage unit in the rewritable non-volatile memory module 220 that is specifically for storing system data.

In the embodiment, as described above, the storage controller 210 further includes the data management circuit 212 and the memory interface control circuit 213. It should be pointed out that the operation executed by each component of the storage controller 220 may be regarded as the operation executed by the storage controller 220.

Specifically, the data management circuit 212 is coupled to the processor 211, the memory interface control circuit 213 and the connection interface circuit 230. The data management circuit 212 receives the command of the processor 211 to perform transfer of data. For example, data is read from the host system 10 (e.g. host memory 120) via the connection interface circuit 230, and the read data is written into the rewritable non-volatile memory module 220 via the memory interface control circuit 213 (e.g., perform writing operation according to the write command from the host system 10). In another example, the data is read from one or more physical units of the rewritable non-volatile memory module 220 via the memory interface control circuit 213, and the read data is written into the host system 10 (e.g., host memory 120) via the connection interface circuit 230 (e.g., perform reading operation according to the read command from the host system 10). In another embodiment, the data management circuit 212 may be integrated with the processor 211. The functions of the data management circuit 212 of the disclosure are described in details in the paragraphs below with reference to a plurality of drawings and embodiments.

The memory interface control circuit 213 receives the command of the processor 211, and performs the writing (also referred to as programming) operation, reading operation or erasing operation to the rewritable non-volatile memory module 220 in cooperation with the data management circuit 212.

For example, the processor 211 may execute a write command sequence to instruct the memory interface control circuit 213 to write the data into a physical unit (also referred to as target physical unit) of the rewritable non-volatile memory module 220; the processor 211 may execute a read command sequence to instruct the memory interface control circuit 213 to read data from one or more physical units of the rewritable non-volatile memory module 220 corresponding to the read command; the processor 211 may execute an erase command sequence to instruct the memory interface control circuit 213 to perform erasing operation on the rewritable non-volatile memory module 220. The write command sequence, the read command sequence and the erase command sequence may respectively include one or more program codes or command codes, and are used for instructing to perform corresponding writing, reading and erasing operations on the rewritable non-volatile memory module 220. In one embodiment, the processor 211 may further give other types of command sequence to the memory interface control circuit 213 so as to perform corresponding operations on the rewritable non-volatile memory module 220.

In addition, the data that is to be written into the rewritable non-volatile memory module 220 is converted into a format that can be accepted by the rewritable non-volatile memory module 220 via the memory interface control circuit 213. Specifically, if the processor 211 is to access the rewritable non-volatile memory module 220, the processor 211 transmits a corresponding command sequence to the memory interface control circuit 213 to instruct the memory interface control circuit 213 to perform the corresponding operation. For example, the command sequences may include the write command sequence that instructs to write data, the read command sequence that instructs to read data, the erase command sequence that instructs to erase data and corresponding command sequences for instructing to perform various memory operations (e.g., changing reading voltage set level or executing garbage collecting process and the like). The command sequences may include one or more signals or data on a bus. The signals or data may include a command code or a program code. For example, in the read command sequence, information such as identification code and memory address corresponding the reading are included therein.

The rewritable non-volatile memory module 220 is coupled to the storage controller 210 (memory interface control circuit 213) and is used for storing the data written by the host system 10. The rewritable non-volatile memory module 220 may be other flash memory modules such as a single level cell (SLC) NAND flash memory module (i.e., one memory cell can store one bit of flash memory module), a multi-level cell (MLC) NAND flash memory module (i.e., one memory cell can store two bits of flash memory module), a triple level cell (TLC) NAND flash memory module (i.e., one memory cell can store three bits of flash memory module), a 3D NAND flash memory module or a vertical NAND flash memory module or other memory module that has the same characteristics. The memory cells in the rewritable non-volatile memory module 220 are arranged in arrays.

In the embodiment, the memory cells of the rewritable non-volatile memory module 220 construct a plurality of physical programming units (also referred to as physical sub-units), and the physical programming units construct a plurality of physical blocks (also referred to as physical erasing units or physical units). Specifically, the memory cells on the same word line (or the same word line layer) make up one or more physical programming units.

In the embodiment, the physical sub-unit serves as the minimum unit for writing (programming) data. The physical unit is the minimum unit for erasing operation, that is, each physical unit includes a smallest number of memory cell that is erased altogether. Each physical unit includes a plurality of physical sub-units. The physical sub-units may be a physical page or a physical sector. In the embodiment, the physical sub-unit includes a data bit area and a redundancy bit area. The data bit area stores user data, and the redundancy bit area stores system data. The system data is, for example, an error correction code, and an error check code or meta data.

The data writing operation, for example, is performed by programming corresponding data to one or more physical pages (i.e., physical sub-units) of the physical unit according to the data writing command corresponding to one logical address, or, for example, programming data to other forms of physical address (e.g., physical sector) of the physical unit. In the embodiment, when the data writing operation (e.g., corresponding data is programmed to a physical page) corresponding to a logical page (logical address) is completed, the processor 211 correspondingly updates the logical-to-physical table to record an address (physical address) of the physical page corresponding to the logical address. In addition, the processor 211 records the corresponding meta data to a redundancy bit area corresponding to the physical page. In the embodiment, the meta data may record the logical address mapped by the physical page. In another embodiment, the meta data may also record a timestamp corresponding to the writing operation. That is, when the data writing operation of the physical page is completed, the processor 211 can record one timestamp to record the current time at which the data writing operation of the physical page is completed.

The host system 10 allocates a plurality of logical units to the rewritable non-volatile memory module 220 via the storage controller 210. The allocated logical units is configured to access the user data stored in the plurality of physical units of the rewritable non-volatile memory module 220. Here, each of the logical units may be made up of one or more logical addresses. For example, the logical unit may be a logical block, a logical page or a logical sector. One logical unit may be mapped to one or more physical units, wherein the physical unit may be one or more physical addresses, one or more physical sectors, one or more physical programming units or one or more physical erasing units.

In the following embodiments, for ease of description, the logical unit is a logical block; a logical sub-unit refers to a logical page, and the logical address refers to a corresponding logical page or an address thereof. Each of the logical unit has a plurality of logical pages (logical addresses); the physical unit refers to a physical block, the physical sub-unit refers to a physical page, and the physical address refers to a corresponding physical page or an address thereof. However, in another embodiment, one physical unit/physical sub-unit may respectively refer to a constitution of a random number of memory cell depending on the actual need. Meanwhile, the physical address may refer to a physical block or an address of a physical page.

Furthermore, the storage controller 210 establishes a logical-to-physical table and a physical-to-logical table so as to record a mapping relationship between the logical unit (e.g., logical block, logical page, logical address or logical sector) and the physical unit (e.g., physical erasing unit, physical programming unit, physical address or physical sector) that are allocated to the rewritable non-volatile memory module 220. That is to say, the storage controller 210 may find the physical unit mapped by one logical unit via the logical-to-physical table, and the storage controller 210 may find the logical unit mapped by one physical unit via the physical-to-logical table. However, the above technical concept regarding mapping the logical unit and the physical unit is a conventional technical means known to persons skilled in the art, and thus no further descriptions are incorporated herein.

In one embodiment, the storage controller 210 further includes a buffer memory and a power management circuit. The buffer memory is coupled to the processor 211 for temporarily storing the data and command from the host system 10, the data from the rewritable non-volatile memory module 220 or other system data (e.g., logical-to-physical table and physical-to-logical table, trim information list and so on) for managing the storage device 20, such that the processor 211 can access the data, command or system data quickly from the buffer memory. The power management circuit is coupled to the processor 211 for controlling the power of the storage device 20.

Figure 2:
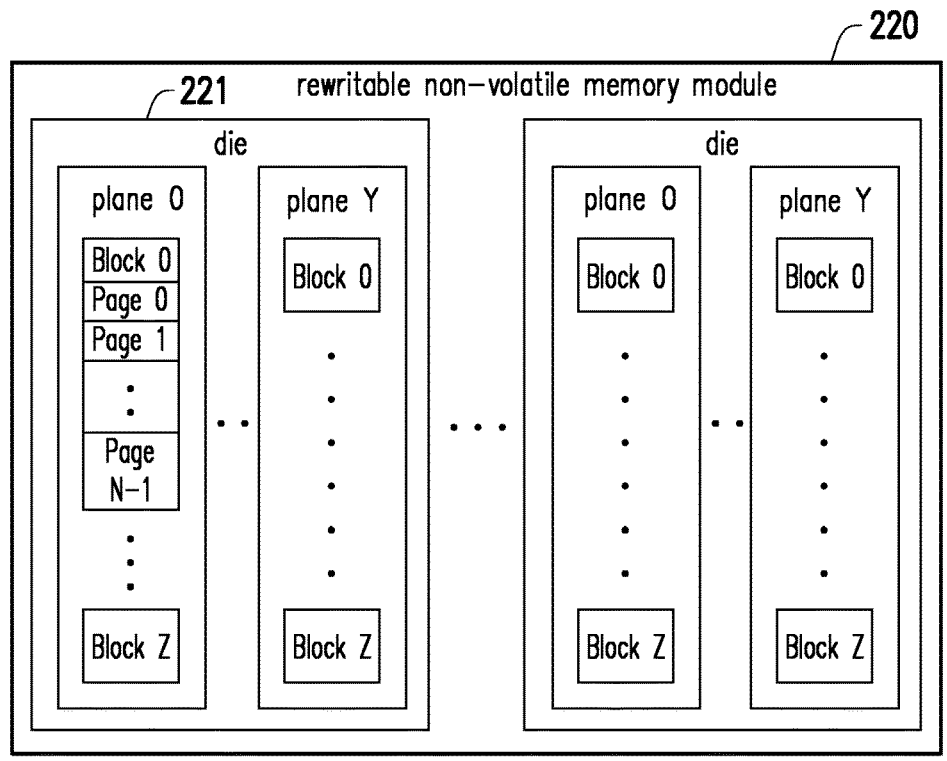
FIG. 2 is a schematic diagram of a rewritable non-volatile memory module according to an embodiment of the disclosure.

FIG. 2 is a schematic diagram of a rewritable non-volatile memory module according to an embodiment of the disclosure.

Referring to FIG. 2, the rewritable non-volatile memory module 220 may have a plurality of dice 221. Each of the dice 221 may have one or more planes such as a plane 0 to a plane Y. Each of the planes may have a plurality of blocks such as a block 0 to a block Z. Each of the blocks may have a plurality of pages such as a page 0 to a page N−1.

Figure 3:
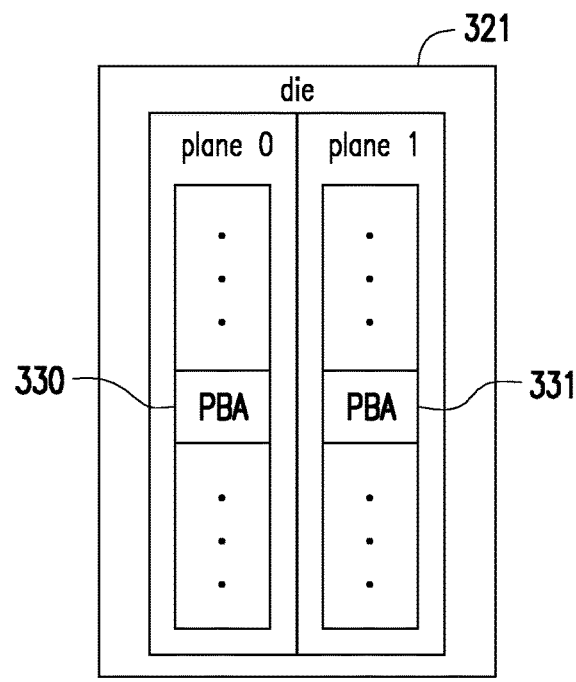
FIG. 3 is a schematic diagram of a die according to an embodiment of the disclosure.
Figure 4:
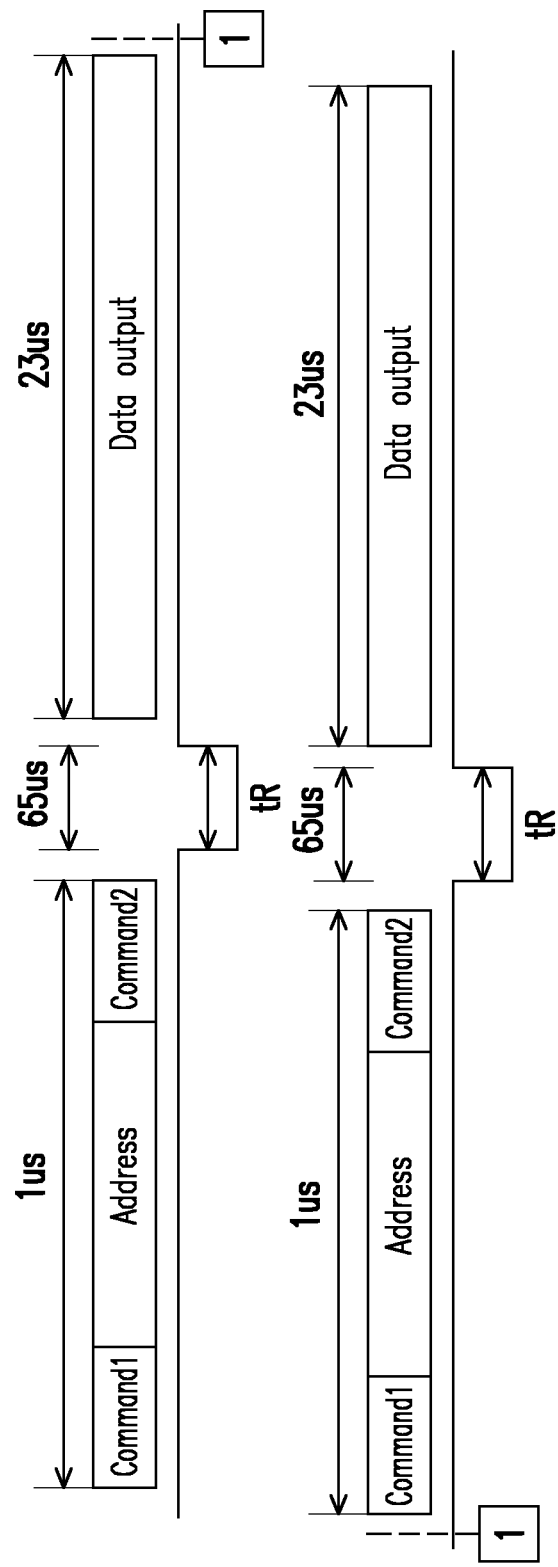
FIG. 4 is a schematic diagram of single plane reading operation according to an embodiment of the disclosure.
Figure 5:
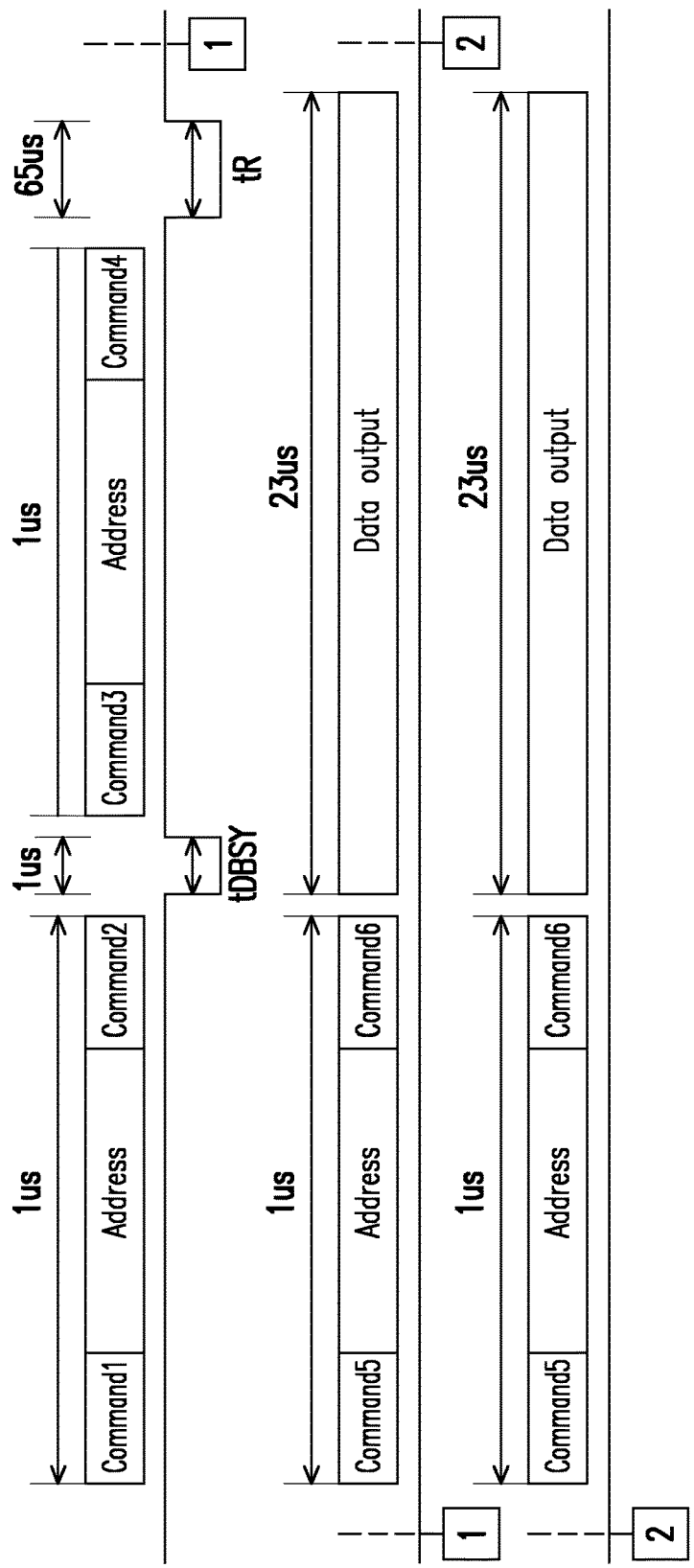
FIG. 5 is a schematic diagram of a 2-plane reading operation according to an embodiment of the disclosure.

FIG. 3 is a schematic diagram of a die according to an embodiment of the disclosure. FIG. 4 is a schematic diagram of single plane reading operation according to an embodiment of the disclosure. FIG. 5 is a schematic diagram of a 2-plane reading operation according to an embodiment of the disclosure.

Referring to FIG. 3 to FIG. 5, in the embodiment, a die 321 has two planes, namely a plane 0 and a plane 1, and each of the planes includes a plurality of physical block addresses (PBA), for example, the plane 0 includes a PBA 330 and so on and the plane 1 includes a PBA 331 and so on. When the processor 221 is to read two data stored in the same plane, only two single plane read commands can be sent to read data as shown in FIG. 4. There is time (tR) of 65 (microseconds, µs) between transmitting address and outputting data, which represents the time for transmitting the data to the flash memory cache register from the flash memory array. Since two single plane read commands are sent in FIG. 4, two time tR is required. When the processor 221 is to read two data (e.g., data corresponding to PBA 330 and PBA 331) stored in different planes, one 2-plane read command may be sent to read the data as shown in FIG. 5. In the process of 2-plane reading operation, only one time tR is required; therefore, the data reading efficiency is better than two times of single plane reading operation. In FIG. 5, tDBSY (Dummy Busy Time) is used for virtual busy time set by multiple planes. In FIG. 4 and FIG. 5, a command 1, a command 2, a command 3 and a command 4 are read commands, and a command 5 and a command 6 are data out commands. FIG. 3 to FIG. 5 show that a higher data reading efficiency may be achieved by storing the sequential data in different planes of the die 321 and using the 2-plane read command to read the data. It should be noted that "1" and "2" in the squares connected with dashed lines in FIG. 4 and FIG. 5 are for connecting a continuous timeline.

Figure 6:
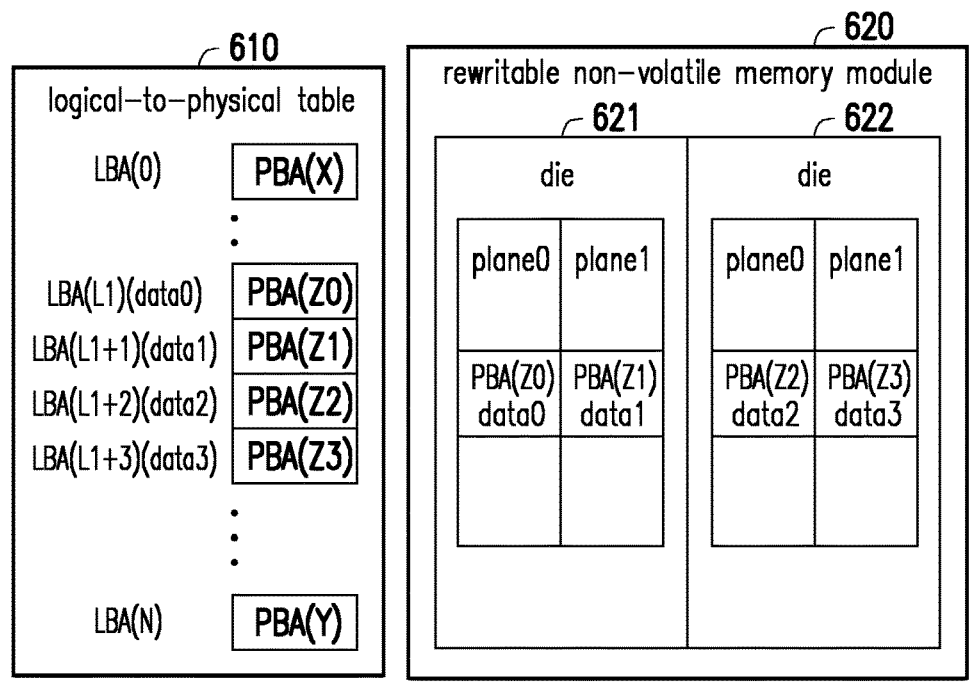
FIG. 6 is a schematic diagram of a sequential data storage method according to an embodiment of the disclosure.

FIG. 6 is a schematic diagram of a sequential data storage method according to an embodiment of the disclosure.

Referring to FIG. 6, the rewritable non-volatile memory module 620 includes a die 621 and a die 622. The die 621 and the die 622 may respectively access data through different channels. In a logical-to-physical table 610, logical block addresses LBA(0), . . . , LBA(L1), LBA(L1+1), LBA(L1+2), LBA(L1+3), . . . , LBA(N) respectively correspond to physical block addresses PBA(X), . . . , PBA(Z0), PBA(Z1), PBA(Z2), PBA(Z3), . . . , PBA(Y). The sequential data of the data 0, the data 1, the data 2 and the data 3 are respectively stored in LBA(L1), LBA(L1+1), LBA(L1+2), LBA(L1+3) and PBA(Z0), PBA(Z1), PBA(Z2) and PBA(Z3).

Figure 7:
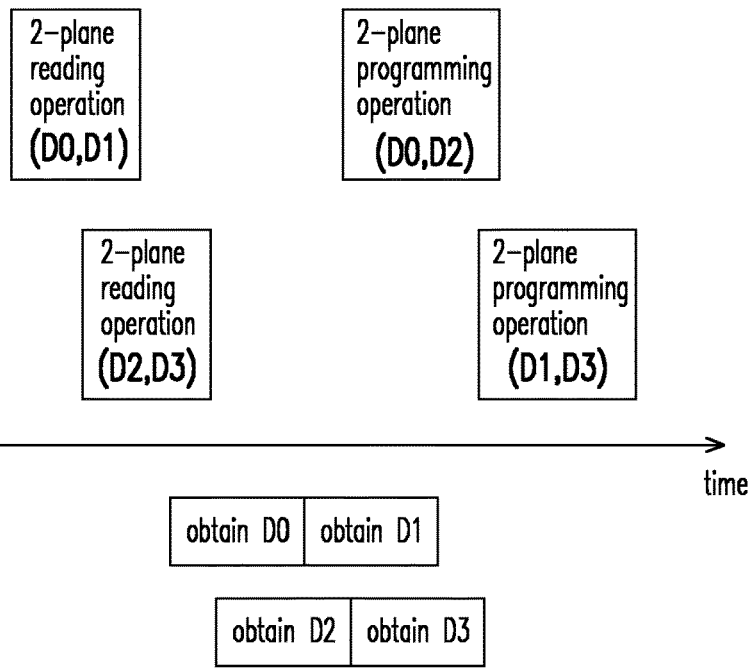
FIG. 7 is a schematic diagram of a timeline of data reading operation according to an embodiment of the disclosure.
Figure 8:
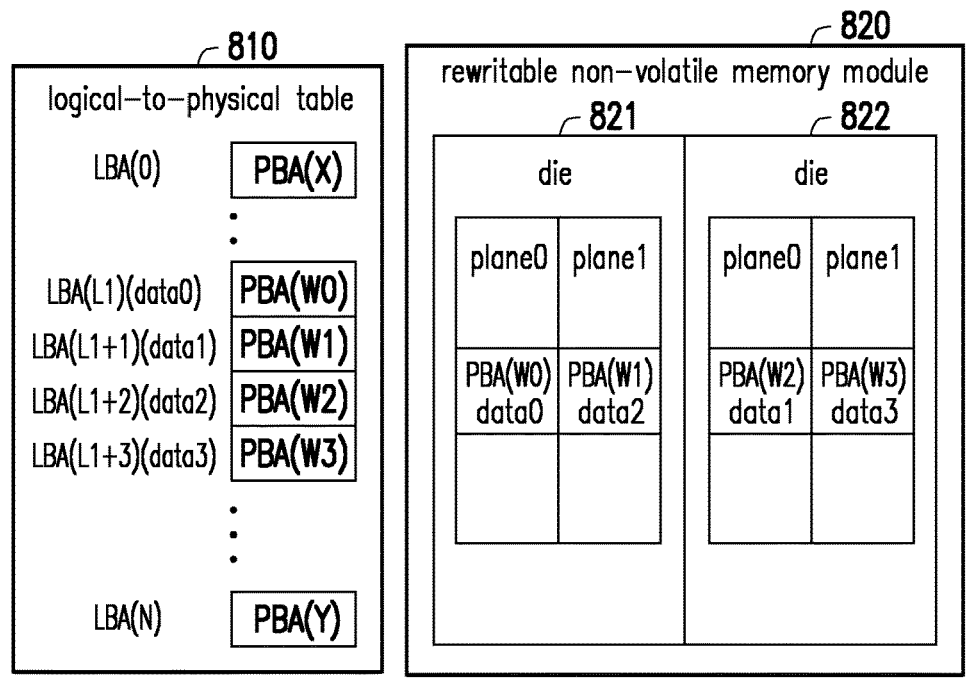
FIG. 8 is a schematic diagram of s sequential data storage method according to an embodiment of the disclosure.

FIG. 7 is a schematic diagram of a timeline of data reading operation according to an embodiment of the disclosure. FIG. 8 is a schematic diagram of s sequential data storage method according to an embodiment of the disclosure.

Referring to FIG. 6, FIG. 7 and FIG. 8, when the processor 21 sends a 2-plane read command corresponding to the data 0(D0) and the data 1(D1) to the die 621 first and then sends a 2-plane read command corresponding to the data 2(D2) and the data 3(D3) to the die 622, D0 and D2 are read to the buffer memory at a time point earlier than the time point at which D1 and D3 are read to the buffer memory. Therefore, the processor 211 sends a 2-plane programming command to D0 and D2 first and then sends the 2-plane programing command to D1 and D3. In this manner, D0 and D1 are likely to be respectively stored in PBA (W0) of a die 821 and PBA(W2) of a die 822 as shown in FIG. 8. Accordingly, when the processor 211 is to read the sequential data D0 and D1, it is not possible to read D0 and D1 through one 2-plane read command. Additionally, D1 is likely to be stored in the plane 0 of the die 821. In such circumstances, two single plane read commands are required for the processor 211 to read D0 and D1, which causes the reading efficiency of sequential data to be decreased.

Figure 9:
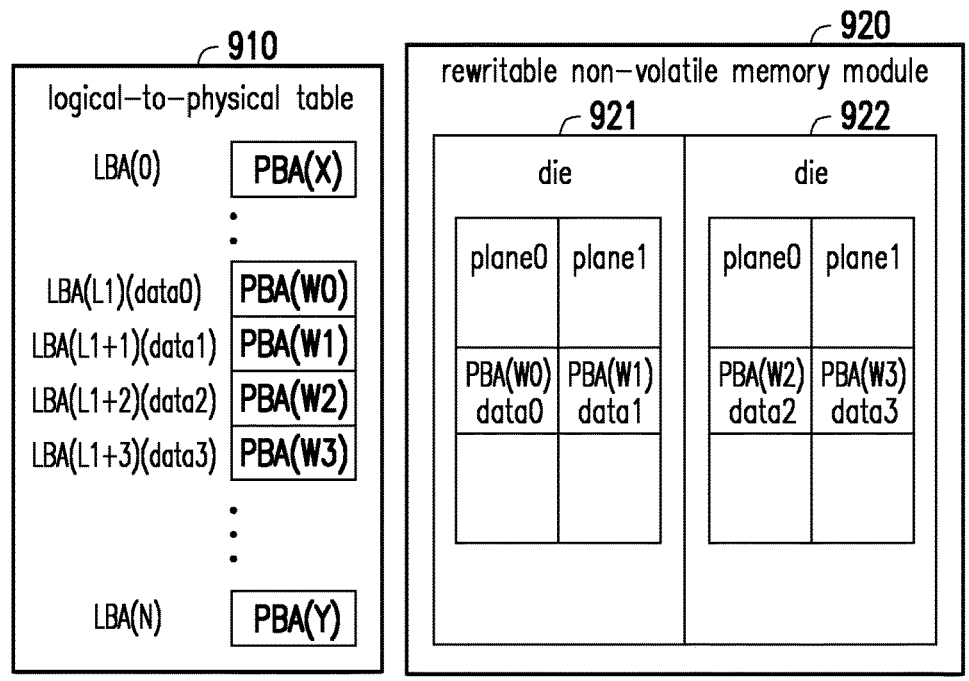
FIG. 9 is a schematic diagram of a sequential data storage method according to another embodiment of the disclosure.

FIG. 9 is a schematic diagram of a sequential data storage method according to another embodiment of the disclosure.

Referring to FIG. 6, FIG. 7 and FIG. 9, although D0 and D2 are read to the buffer memory at a time point earlier than the time point at which D1 and D3 are read to the buffer memory, since D0, D1, D2 and D3 are sequential data, the processor 211 sends the 2-plane programming command to respectively store D0 and D1 in PBA(W0) of the plane 0 and PBA(W1) of the plane 1 of a die 921, and sends the 2-plane programming command to respectively store D2 and D3 in PBA(W2) of the plane 0 and PBA(W3) of the plane 1 of a die 922. The die 921 and the die 922 may respectively access data through different channels. In this manner, the processor 211 may read D0 and D1 through a single 2-plane read command and thus maintaining a higher reading efficiency. It should be indicated that the size of PBA of one plane may be the size of one physical block and may be the size of one physical page, the disclosure provides no limitation thereto.

Figure 10:
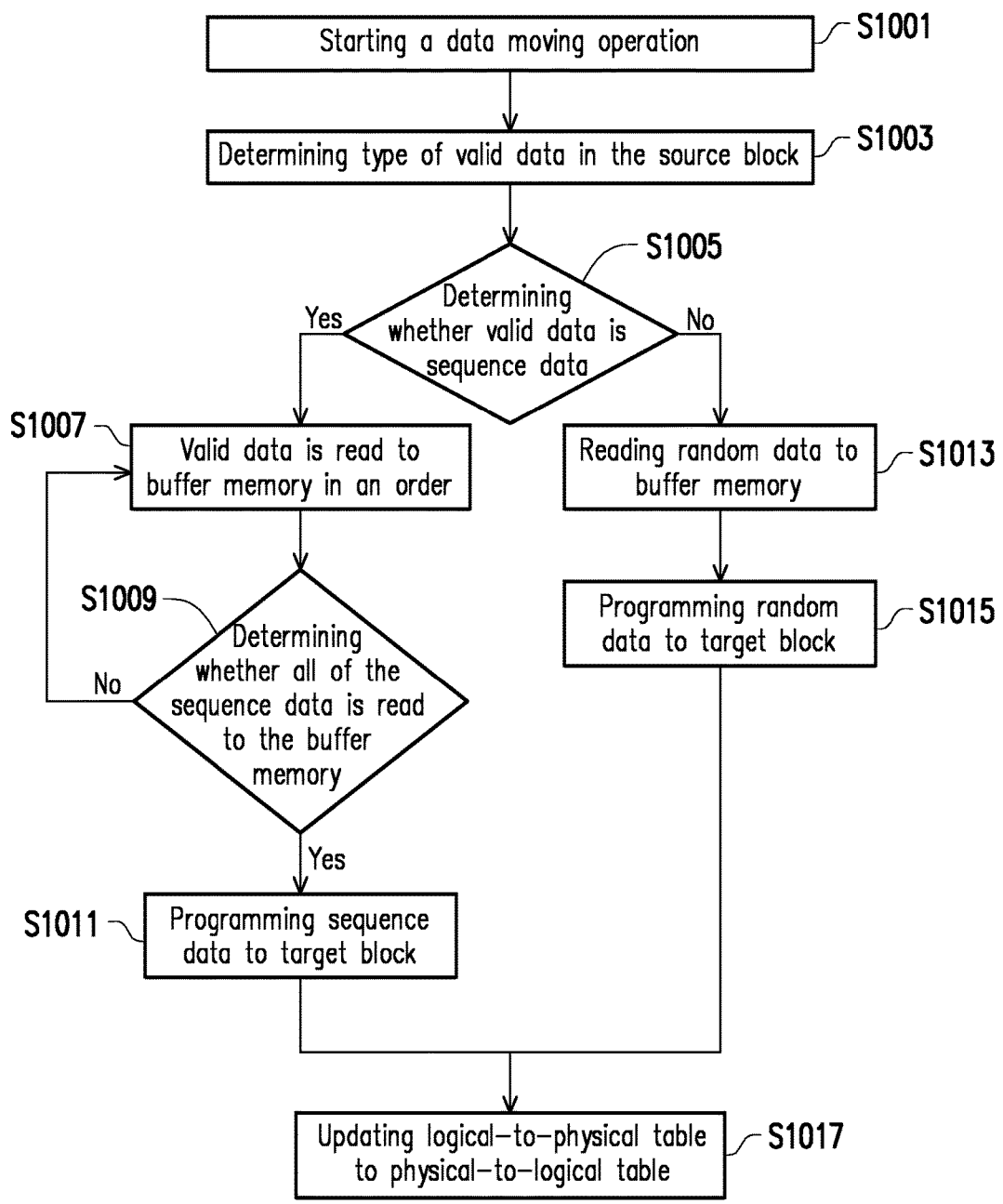
FIG. 10 is a diagram of a flowchart showing a data moving method according to an embodiment of the disclosure.

FIG. 10 is a diagram of a flowchart showing a data moving method according to an embodiment of the disclosure.

Referring to FIG. 10, in step S1001, a data moving operation is started. Specifically, the data moving operation may be a garbage collection (GC) operation, a wear leveling operation or other data moving operation. In the data moving operation, the processor 211 selects one or more source blocks and moves valid data in the source block to a target block. The source block is a block in which the valid data is stored and a portion of the valid data may become invalid data. The target block is a block that is performed with erase operation but not programmed yet and is used for storing moved data.

In step S1003, the type of valid data in the source block is determined. Specifically, the processor 211 may determine the type of valid data according the address/size of valid the data in the source block or according to both of the address and size of the valid data in the source block. The following embodiment exemplifies how the processor 211 determines the valid data in the source block. The processor 211 may find a logical block address corresponding to a physical block address corresponding to a data in the physical-to-logical table, and find a physical block address corresponding to the logical block address according to the logical-to-physical table. If the physical block address obtained from the logical-to-physical table is the same as the physical block address of the data, the processor 211 determines that the data is valid data.

In step S1005, it is determined whether valid data is sequential data. Specifically, the processor 211 determines whether a data (e.g., first data) is valid data first. If the first data is valid data, the processor 211 finds another data (e.g., second data) directly adjacent to the physical block address of the first data, and finds a logical block address corresponding to a physical block address of the second data according to the physical-to-logical table. If the second data is valid data and the logical block address of the second data is directly adjacent to the logical block address of the first data, the processor 211 may determine that the first data and the second data are sequential data.

If the valid data is sequential data, in step S1007, the valid is read to the buffer memory in an order. In step S1009, it is determined whether all of the sequential data is read to the buffer memory. Specifically, when determining whether the valid data is sequential data, the processor 211 may determine the length (or referred to as size) of the sequential data first. The basic unit for determining the size of sequential data may be the size (e.g., 16 KB) of a page, the size (e.g., 2 KB) of a codeword, or the size (e.g., 4 KB) of a logical block address and so on, the disclosure provides no limitation thereto. Apart from determining the length of the sequential data, the processor 211 also provides an identification (ID) code corresponding to the sequential data to determine which sequential data is moved. If not all of the sequential data is read to the buffer memory yet, step S1007 is resumed, and the valid data is continuously read to the buffer memory in an order.

In one embodiment, if the size of the sequential data is too large, the processor 211 may cut the sequential data according to a predetermined size. The predetermined size may be the size of a number of physical sub-units in a plane of a die. For example, when one die has two planes, the predetermined size may be the size of two physical sub-units. When one die has four planes, the predetermined size may be the size of four physical sub-units, and the rest may be deduced from the above.

If all of the sequential data is read to the buffer memory, in step S1011, the sequential data is programmed to the target block. In the process of programming the sequential data to the target block, the processor 211 maintains that the programmed sequential data and the original sequential data in the source block have the same arranging order. For example, in FIG. 6, the sequential data of the data 0, the data 1, the data 2 and the data 3 is arranged sequentially in the plane 0 of the die 621, the plane 1 of the die 621, the plane 0 of the die 622 and the plane 1 of the die 621. In this manner, after the data moving operation is performed, the sequential data of the data 0, the data 1, the data 2 and the data 3 is arranged sequentially in the plane 0 of the die 921, the plane 1 of the die 921, the plane 0 of the die 922 and the plane 1 of the die 921 as shown in FIG. 9. Such arrangement allows the processor 211 to achieve better efficacy when reading sequential data because the processor 211 may send 2-plane read commands through different channels respectively to read the sequential data of the data 0, the data 1, the data 2 and the data 3.

In the exemplary embodiment, the physical block addresses of the data 0, the data 1, the data 2 and the data 3 in the die 621 and the die 622, namely PBA(Z0), PBA(Z1), PBA(Z2) and PBA(Z3), are arranged in parallel. Therefore, the physical block addresses of the data 0, the data 1, the data 2 and the data 3 in the die 621 and the die 622, namely PBA(W0), PBA(W1), PBA(W2) and PBA(W3), are arranged in parallel as well. The parallel arrangement of the physical block addresses also represent that the indexes of PBA(Z0), PBA(Z1), PBA(Z2) and PBA(Z3) in the plane 0 of the die 621, the plane 1 of the die 621, the plane 0 of the die 622 and the plane 1 of the die 622 are the same. The size of physical block address may be used as the basic unit for the indexes of the plane 0 and the plane 1. For example, the index of a first physical block address in the plane 0 is 1, and the index of a second physical block address is 2, and the rest may be deduced from the above.

If the valid data is not sequential data, that is, if the valid data is random data, in step S1013, the random data is read to the buffer memory. In step S1015, the random data is programmed to the target block.

In step S1017, the logical-to-physical table and the physical-to-logical table are updated. Specifically, when all of the valid data is moved to the target block from the source block, the processor 211 updates the logical-to-physical table and the physical-to-logical table according to the physical block address and the logical block address of the valid data, and finally completes data moving operation.

In one embodiment, the sequential data may be a movie, and the movie may include metadata such as subtitle. When the host system 10 updates the subtitle in the data moving operation of movie file, read error may occur at a later time. Therefore, in the data moving operation, the processor 211 determines whether the physical block address corresponding to one data (e.g., first data) in the sequential data is the same as a physical address, which is converted by the physical-to-logical table into a logical block address from the physical block address corresponding to the first data and then converted into a physical address by the logical-to-physical table. If it is determined that the physical block address and the physical address are the same, it represents that the first data is not updated by the host system 10 in the data moving operation, and thus the processor 211 may directly use the physical block address in the target block of the first data to update the logical-to-physical table. If it is determined that the physical block address and the physical address are different, the processor 211 sets the first data to be invalid.

In one embodiment, in the data moving operation, if the processor 211 receives a programming command from the host system 10 to program one data (e.g., fifth data) and the logical block address of the fifth data is the same as the logical block address of one data (e.g., first data) in the sequential data, the processor 211 directly programs the fifth data to the target block to directly replace the first data.

In summary, in the disclosure, the data moving method and the storage controller determine whether the valid data for performing data moving operation is sequential data. If the valid data for performing data moving operation is sequential data, the processor transmits the first data, the third data, the second data and the fourth data in the valid data to the buffer memory in an order, and programs the first data, the third data, the second data and the fourth data to the die without changing the original data continuity of the first data, the third data, the second data and the fourth data before the data moving operation. In this manner, the sequential data may still maintain the original data continuity after data moving operation, and thus the efficacy of reading operation of sequential data may be enhanced.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A data moving method, adapted for controlling a storage device equipped with a flash memory, the storage device being controlled by a storage controller, the flash memory comprising a plurality of dice, the dice comprising a first die corresponding to a first channel and a second die corresponding to a second channel, each of the dice comprising a first plane and a second plane, the method comprising:

performing a data moving operation by the storage controller to obtain a valid data from a plurality of source blocks, the valid data comprising a first data, a second data, a third data and a fourth data;

determining whether the valid data is a sequential data by the storage controller;

when the valid data is the sequential data, transmitting a first 2-plane read command by the storage controller to read the first data and the second data respectively from the first plane and the second plane of the first die through the first channel, transmitting a second 2-plane read command to read the third data and the fourth data respectively from the first plane and the second plane of the second die through the second channel, and transmitting the first data, the third data, the second data and the fourth data to a buffer memory in order; and transmitting a first 2-plane programming command by the storage controller to respectively program the first data and the second data to the first plane and the second plane of a third die among the dice, and transmitting a second 2-plane programming command to respectively program the third data and the fourth data to the first plane and the second plane of a fourth die among the dice.

2. The data moving method according to claim 1, wherein the first data, the second data, the third data and the fourth data of the third die and the fourth die have continuous physical block addresses (PBA).

3. The data moving method according to claim 1, further comprising:

generating an ID code and a data length corresponding to the sequential data, and reading the sequential data to the buffer memory until the data length of the sequential data is reached.

4. The data moving method according to claim 1, wherein the step of determining whether the valid data is the sequential data comprises: determining whether the valid data is the sequential data according to a logical-to-physical (L2P) table and a physical-to-logical (P2L) table.

5. The data moving method according to claim 4, further comprising:

obtaining a first logical block address corresponding to a first physical block address of the first data according to the physical-to-logical table;

when a physical block address corresponding to the first logical block address obtained from the logical-to-physical table is the first physical block address, determining that the first data is valid;

obtaining a second physical block address directly adjacent to the first physical block address, the second physical block address storing the second data;

obtaining a second logical block address corresponding to the second physical block address of the second data according to the physical-to-logical table;

when a physical block address corresponding to the second logical block address obtained from the logical-to-physical table is the second physical block address, determining that the second data is valid;

when the second logical block address and the first logical block address are directly adjacent to each other, determining that the first data and the second data are the sequential data.

6. The data moving method according to claim 1, wherein the sequential data is cut based on a predetermined size, the predetermined size may be a size of a number of physical sub-units in a plane of a die.

7. The data moving method according to claim 1, wherein after the first data, the second data, the third data and the fourth data are respectively programmed to the third die and the fourth die, a logical-to-physical (L2P) table and a physical-to-logical (P2L) table are updated according to physical block addresses of the first data, the second data, the third data and the fourth data.

8. The data moving method according to claim 1, wherein an index of the first data in the first plane of the third die, an index of the second data in the second plane of the third die, an index of the third data in the first plane of the fourth die and an index of the fourth data in the second plane of the fourth die are all the same.

9. The data moving method according to claim 1, wherein unit of the first data, the second data, the third data and the fourth data is a page, a codeword, or a logical block address unit.

10. The data moving method according to claim 1, wherein after the first 2-plane read command is transmitted, it is determined whether a physical block address corresponding to the first data of the first die is the same as a physical address, which is converted by a physical-to-logical table into a logical block address from a physical block address corresponding to the first data of the first die and then converted into the physical address by a logical-to-physical table, if the physical block address and the physical address are different, the first data of the first die is set as invalid.

11. The data moving method according to claim 1, wherein after the first 2-plane read command is transmitted, if a host system receives a programming command to program a fifth data to the flash memory and a logical block address of the fifth data is the same as a logical block address of the first data, the fifth data and the second data are respectively programmed to the first plane and the second plane of the third die according to the first 2-plane programming command.

12. A storage controller, adapted for controlling a storage device equipped with a flash memory, the flash memory comprising a plurality of dice, the dice comprising a first die corresponding to a first channel and a second die corresponding to a second channel, each of the dice comprising a first plane and a second plane, the storage controller comprising:
   a processor; and
   a memory, coupled to the processor, the memory comprising a buffer memory, wherein
   the processor performs a data moving operation to obtain a valid data from a plurality of source blocks, the valid data comprising a first data, a second data, a third data and a fourth data;
   the processor determining whether the valid data is a sequential data;
   wherein when the valid data is the sequential data, the processor transmits a first 2-plane read command to read the first data and the second data respectively from the first plane and the second plane of the first die through the first channel, transmits a second 2-plane read command to read the third data and the fourth data respectively from the first plane and the second plane of the second die through the second channel, and transmits the first data, the third data, the second data and the fourth data to the buffer memory in order; and
   the processor transmits a first 2-plane programming command to respectively program the first data and the second data to the first plane and the second plane of a third die among the dice, and transmits a second 2-plane programming command to respectively program the third data and the fourth data to the first plane and the second plane of a fourth die among the dice.

13. The storage controller according to claim 12, wherein the first data, the second data, the third data and the fourth data of the third die and the fourth die have continuous physical block addresses (PBA).

14. The storage controller according to claim 12, wherein the processor generates an ID code and a data length corresponding to the sequential data, and reading the sequential data to the buffer memory until the data length of the sequential data is reached.

15. The storage controller according to claim 12, wherein the processor determines whether the valid data is the sequential data according to a logical-to-physical table and a physical-to-logical table.

16. The storage controller according to claim 15, wherein the processor obtains a first logical block address corresponding to a first physical block address of the first data according to the physical-to-logical table;
   when a physical block address corresponding to the first logical block address obtained from the logical-to-physical table is the first physical block address, the processor determines that the first data is valid;
   the processor obtains a second physical block address directly adjacent to the first physical block address, the second physical block address storing the second data;
   the processor obtains a second logical block address corresponding to the second physical block address of the second data according to the physical-to-logical table;
   when a physical block address corresponding to the second logical block address obtained from the logical-to-physical table is the second physical block address, the processor determines that the second data is valid;
   when the second logical block address and the first logical block address are directly adjacent to each other, the processor determines that the first data and the second data are the sequential data.

17. The storage controller according to claim 16, wherein after the first 2-plane read command is transmitted, the processor determines whether a physical block address corresponding to the first data of the first die is the same as a physical address, which is converted by a physical-to-logical table into a logical block address from a physical block address corresponding to the first data of the first die and then converted into the physical address by a logical-to-physical table, if the physical block address and the physical address are different, the first data of the first die is set as invalid.

18. The storage controller according to claim 16, wherein after the first 2-plane read command is transmitted, the processor receives a programming command from a host system to program a fifth data to the flash memory and a logical block address of the fifth data is the same as a logical block address of the first data, the processor respectively programs the fifth data and the second data to the first plane and the second plane of the third die according to the first 2-plane programming command.

19. The storage controller according to claim 12, wherein the sequential data is cut based on a predetermined size, the predetermined size may be a size of a number of physical sub-units in a plane of a die.

20. The storage controller according to claim 12, wherein after the first data, the second data, the third data and the fourth data are respectively programmed to the third die and the fourth die, a logical-to-physical table and a physical-to-logical table are updated according to physical block addresses of the first data, the second data, the third data and the fourth data.

21. The storage controller according to claim 12, wherein an index of the first data in the first plane of the third die, an index of the second data in the second plane of the third die, an index of the third data in the first plane of the fourth die and an index of the fourth data in the second plane of the fourth die are all the same.

22. The storage controller according to claim 12, wherein unit of the first data, the second data, the third data and the fourth data is a page, a codeword, or a logical block address unit.

* * * * *